United States Patent [19]
Wong

[11] Patent Number: 5,936,862
[45] Date of Patent: Aug. 10, 1999

[54] COMPUTER PROGRAM FOR GENERATING PICTURE FRAMES

[75] Inventor: Mark S. Wong, San Bernardino, Calif.

[73] Assignee: DogByte Development, Los Angeles, Calif.

[21] Appl. No.: 08/858,573

[22] Filed: May 19, 1997

[51] Int. Cl.$^6$ .................................................. G06F 19/00
[52] U.S. Cl. .............................. 364/468.24; 364/468.25; 40/750; 248/459
[58] Field of Search ........................ 364/471.01, 471.03, 364/468.25, 468.24; 40/750, 769; 248/459

[56] References Cited

U.S. PATENT DOCUMENTS

| | | | |
|---|---|---|---|
| 4,723,203 | 2/1988 | Kishi et al. .............................. | 364/171 |
| 5,005,869 | 4/1991 | Smith ...................................... | 281/15.1 |
| 5,494,445 | 2/1996 | Sekiguchi et al. ...................... | 434/365 |
| 5,575,099 | 11/1996 | Strobel et al. ............................ | 40/584 |
| 5,695,346 | 12/1997 | Sekiguchi et al. ...................... | 434/365 |

*Primary Examiner*—Paul P. Gordon
*Attorney, Agent, or Firm*—Christie, Parker & Hale, LLP

[57] ABSTRACT

A computer program for generating picture frames and, in particular embodiments, a computer program that generates a frame pattern which includes a folding and cutting pattern to be printed on a substrate such that the substrate can be cut and folded according to the folding and cutting pattern to create a picture frame. Such frame pattern may also include design patterns prestored in the computer program or imported by the user.

15 Claims, 23 Drawing Sheets

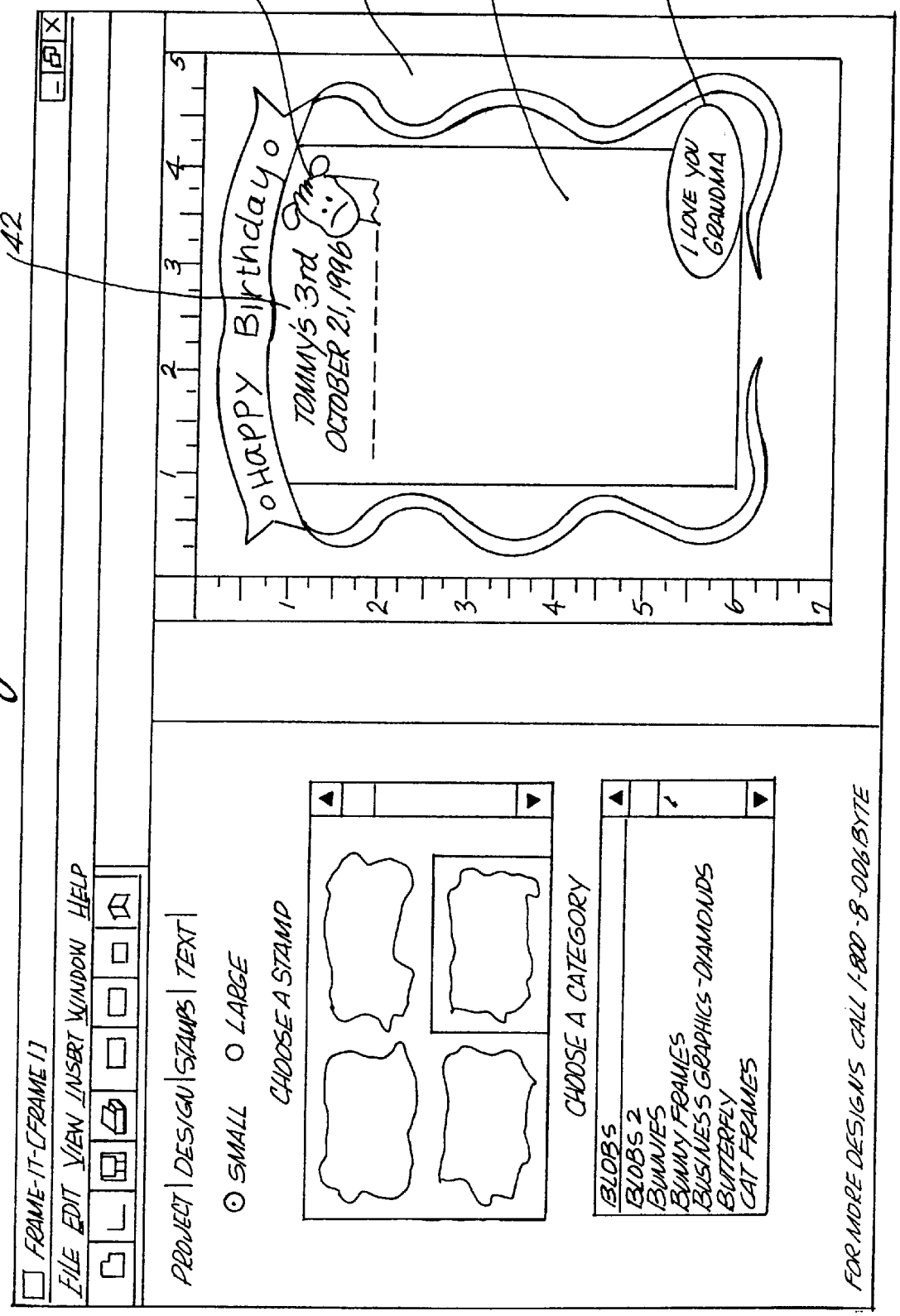

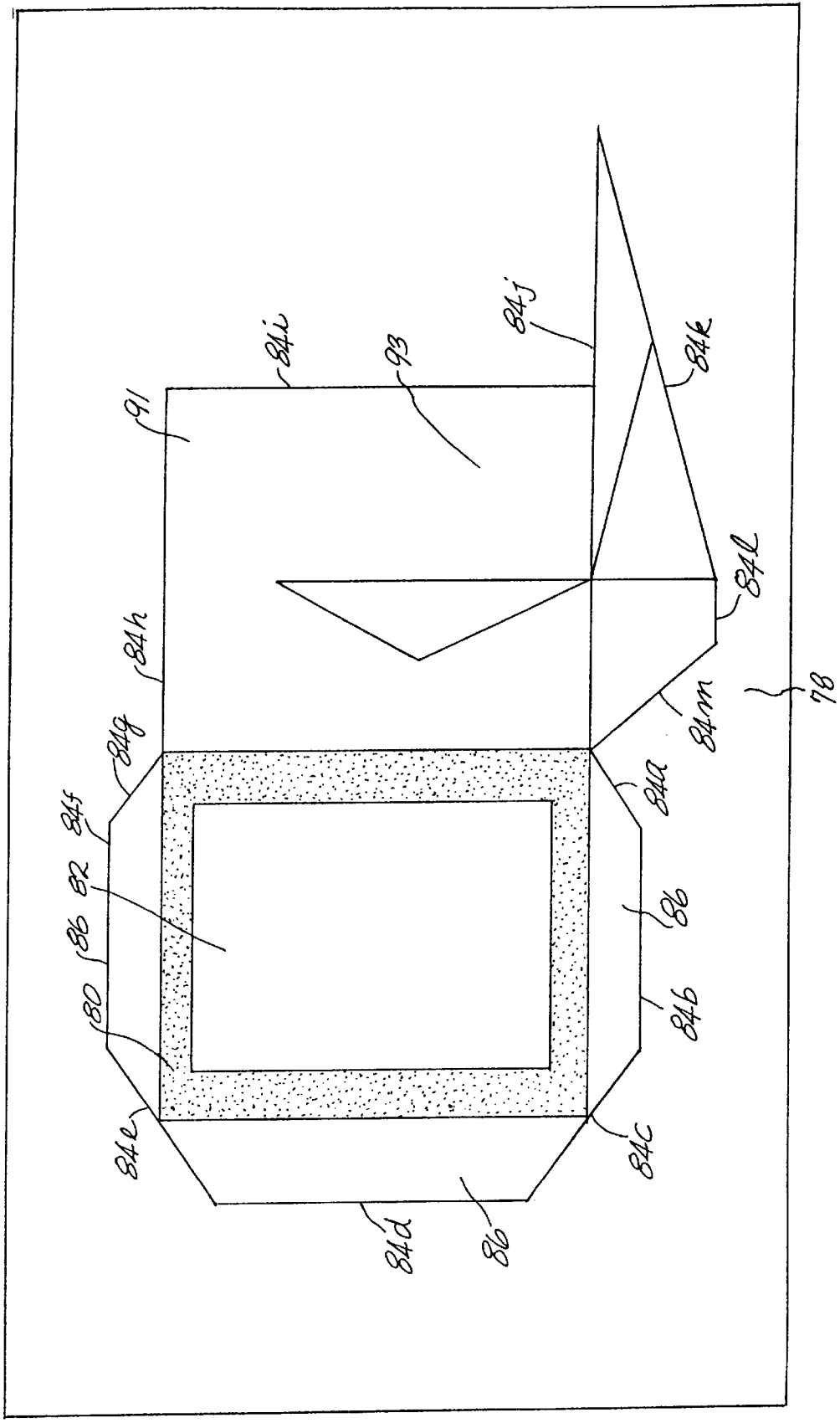

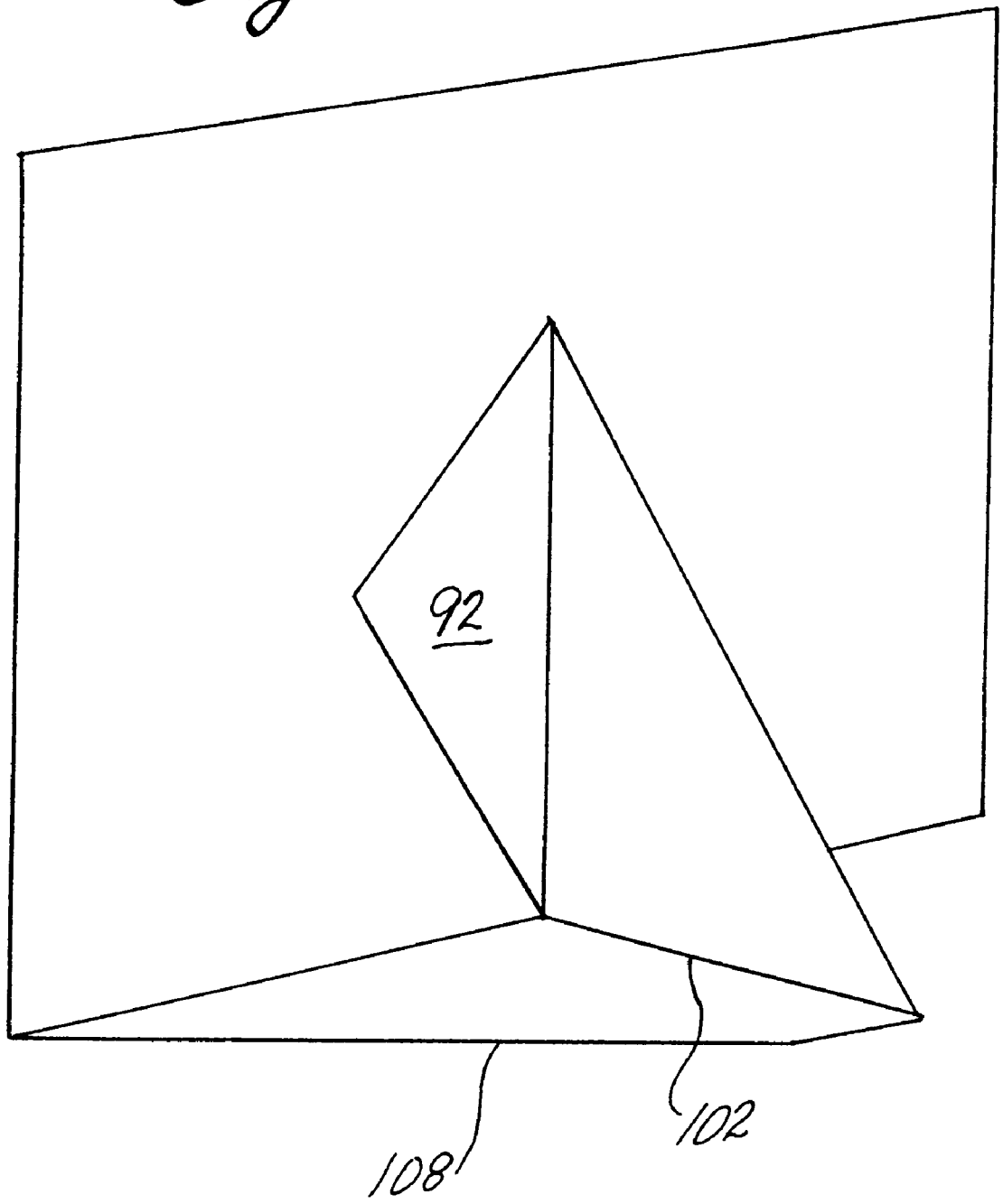

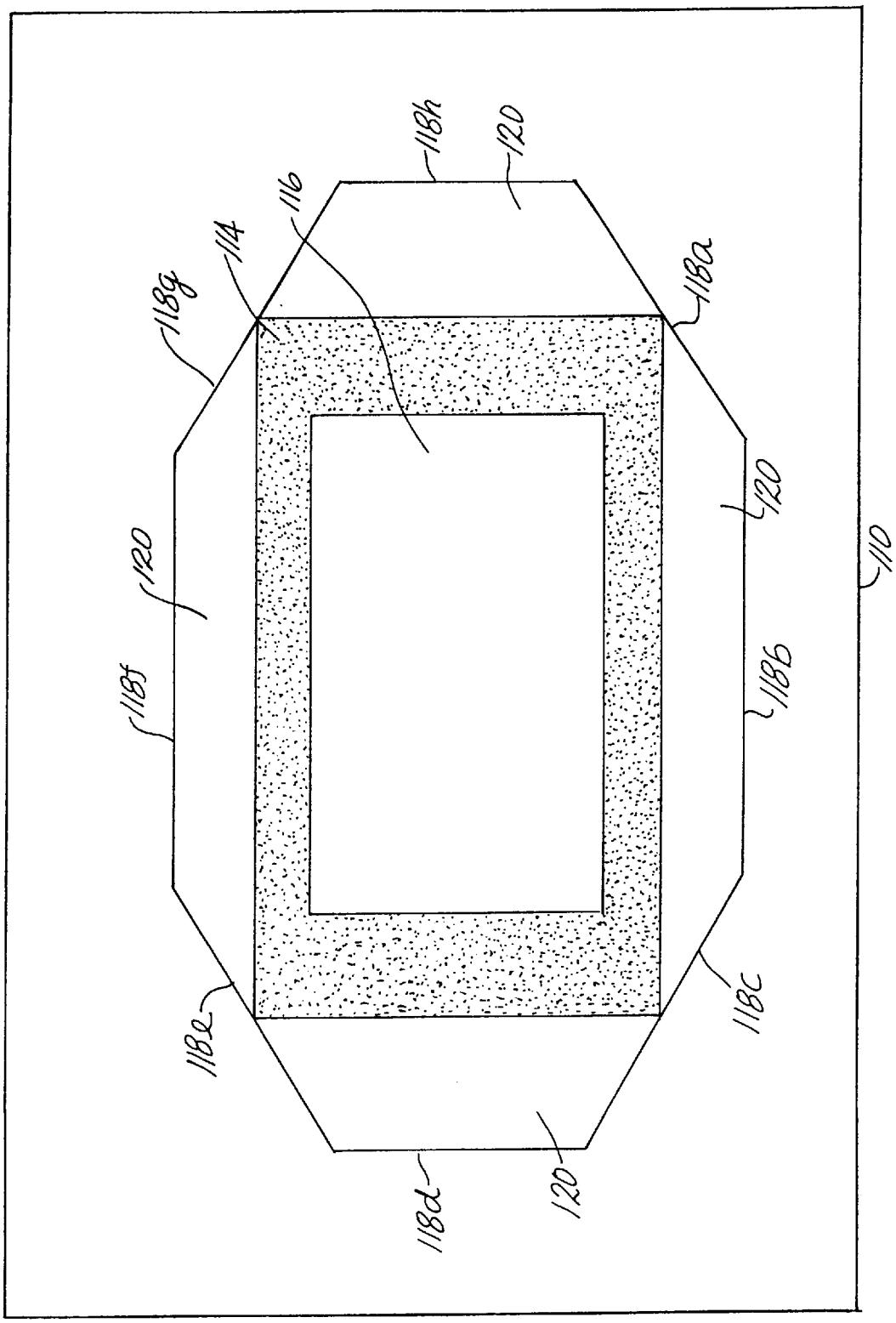

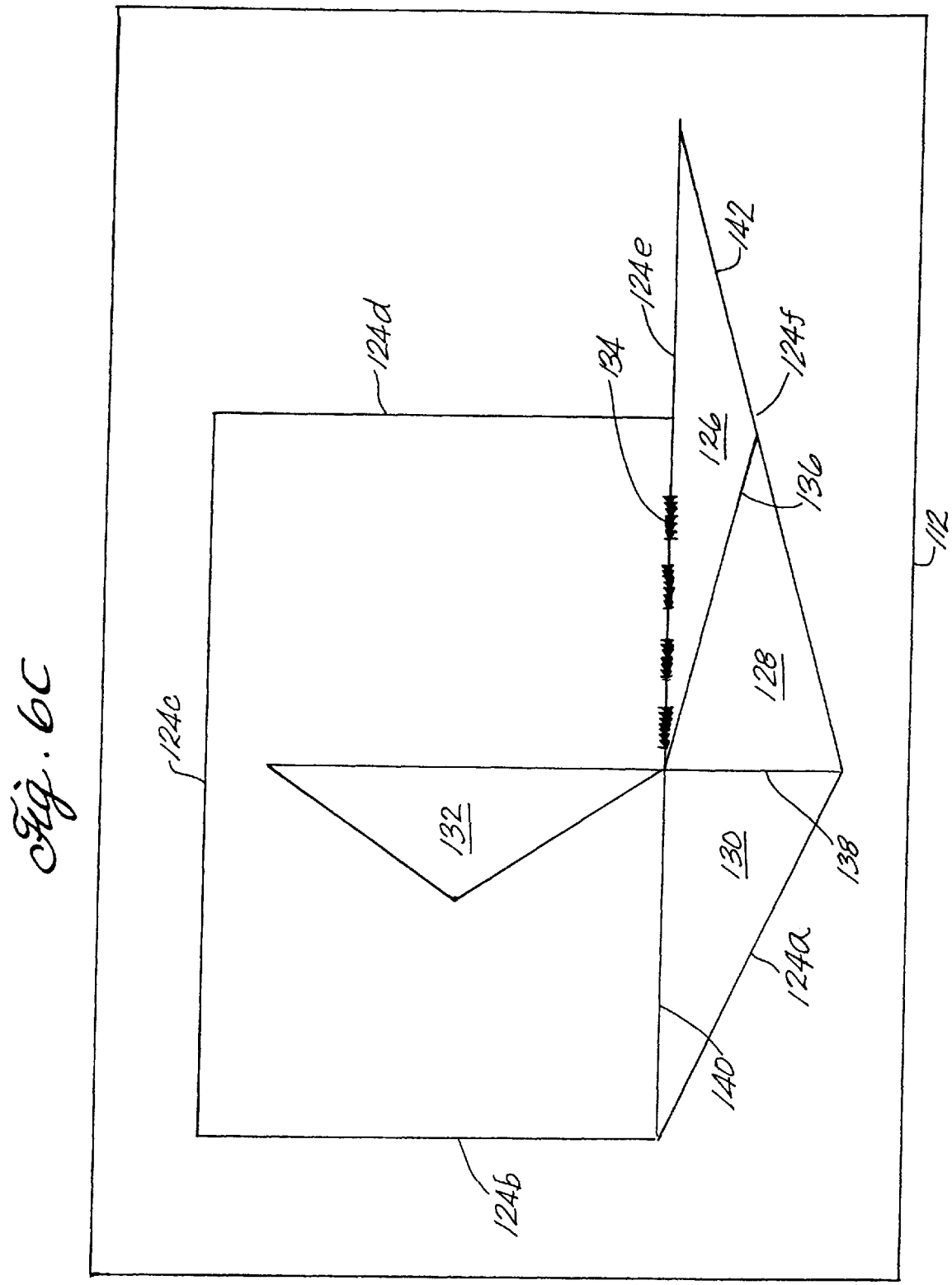

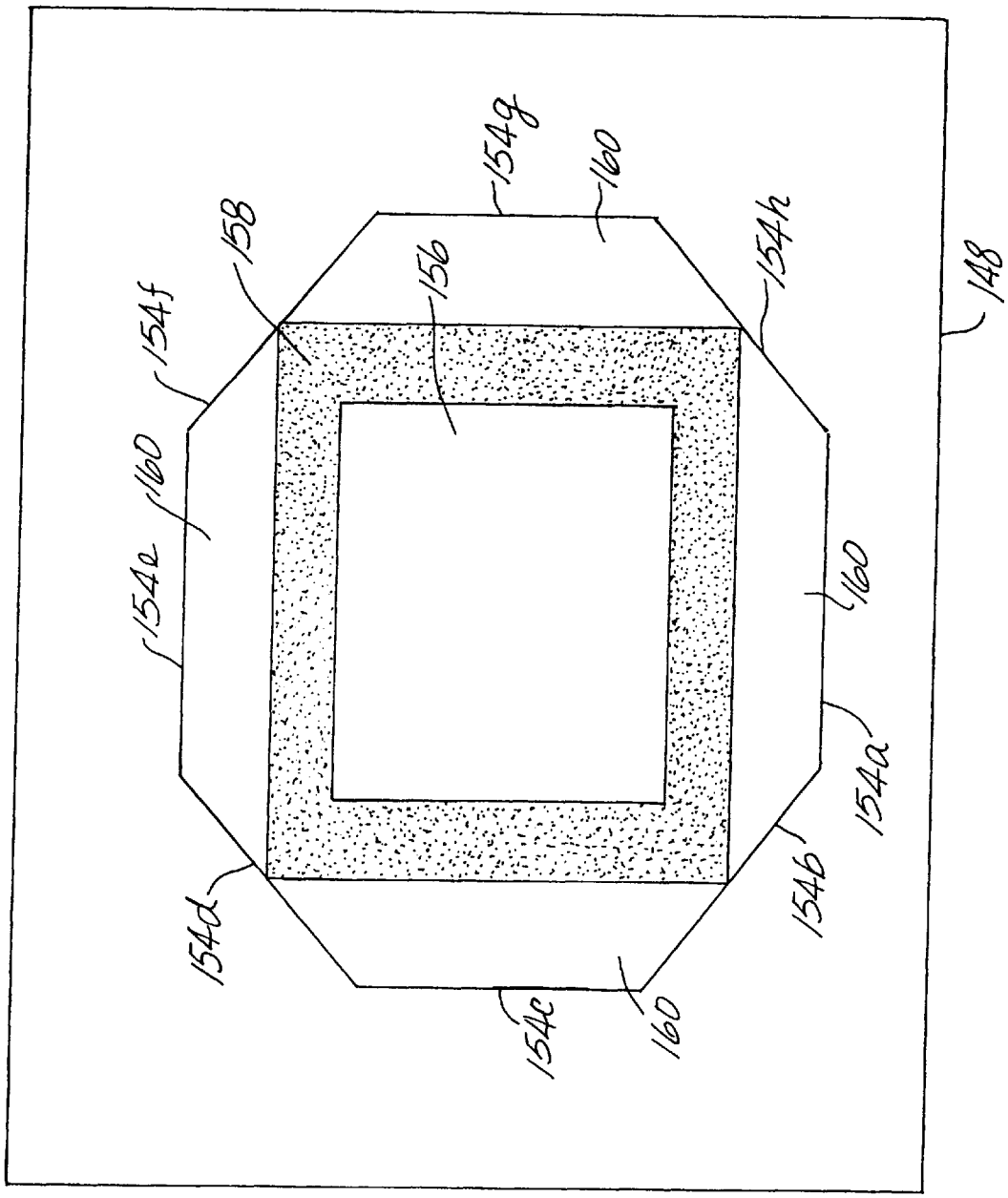

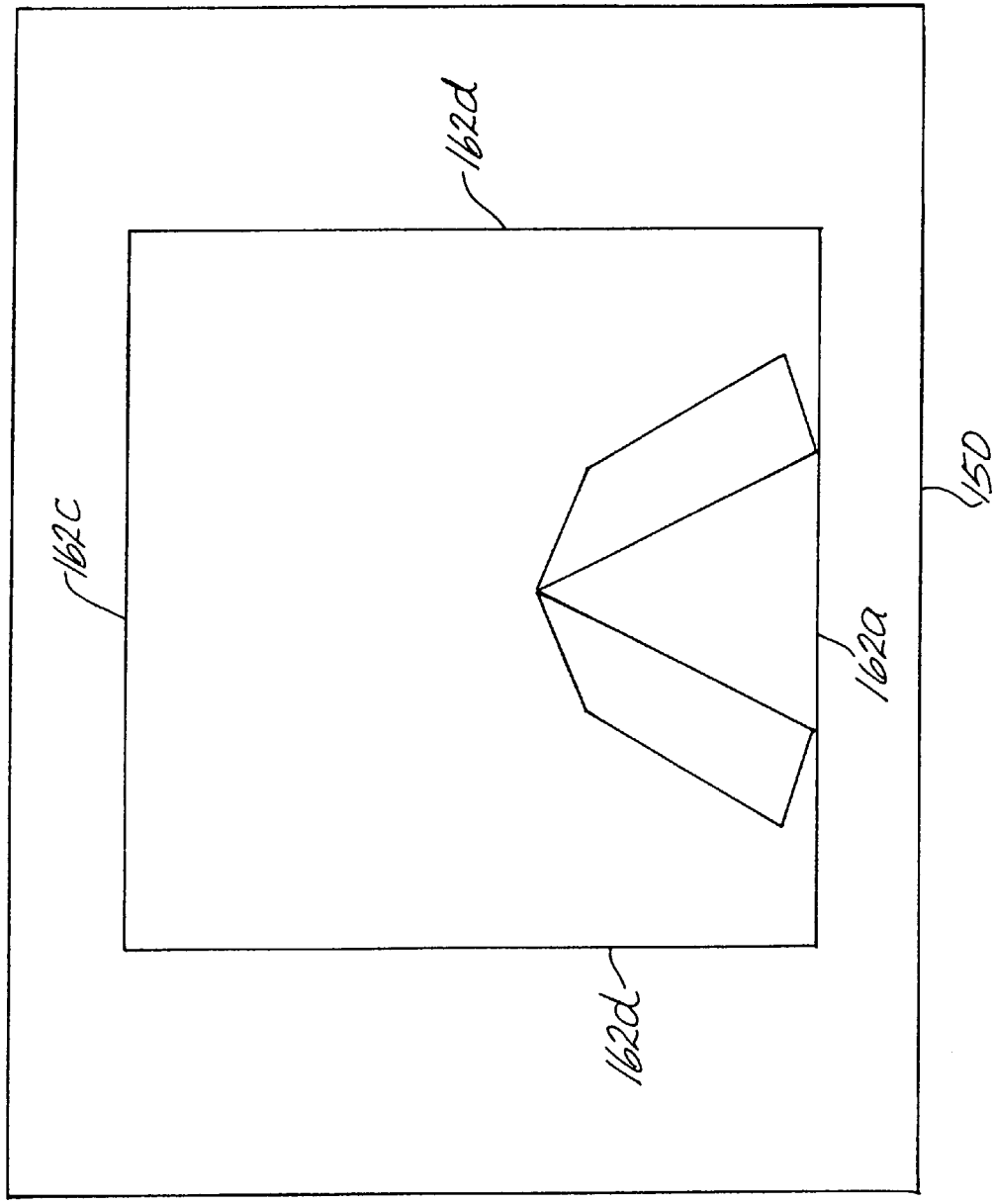

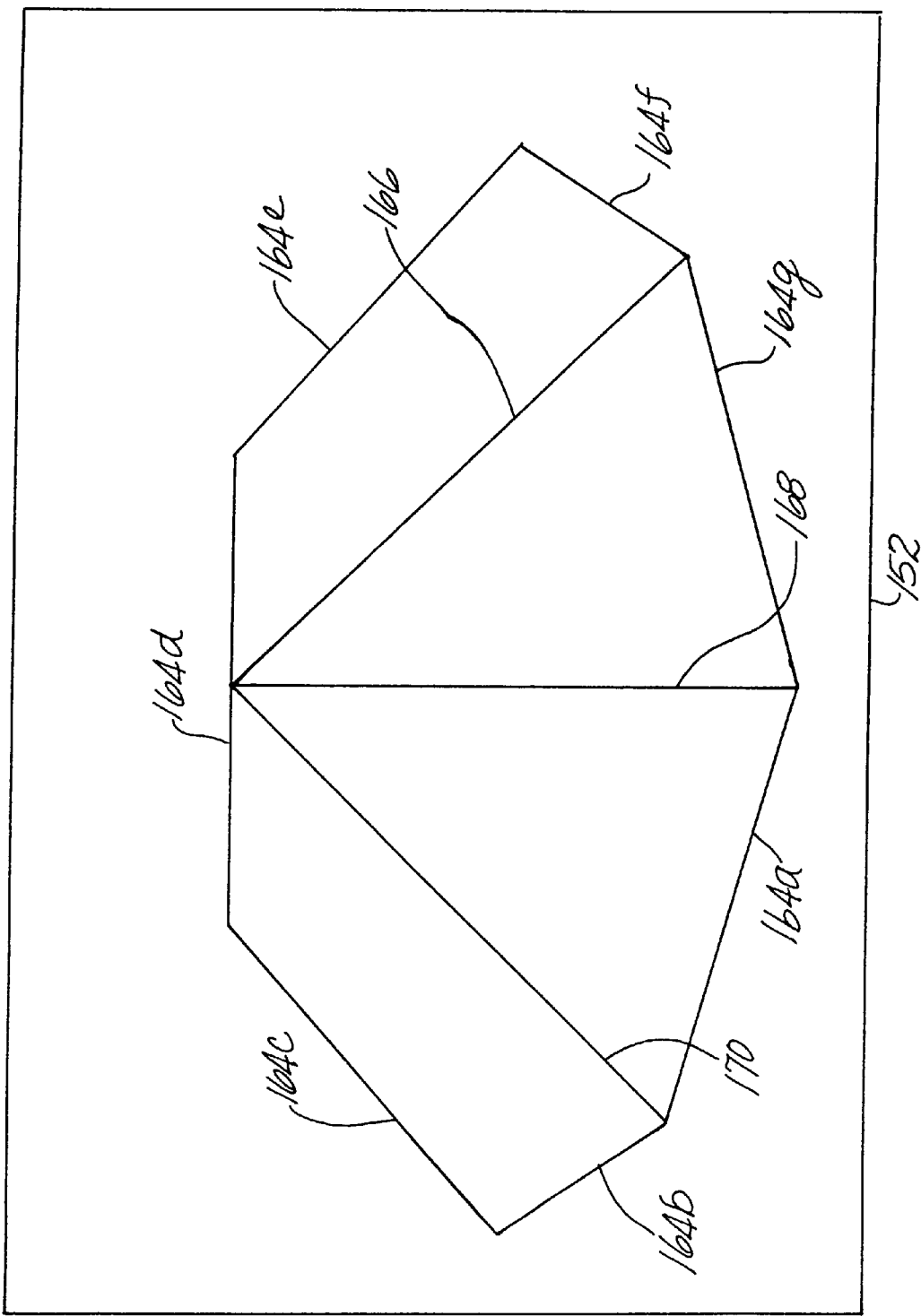

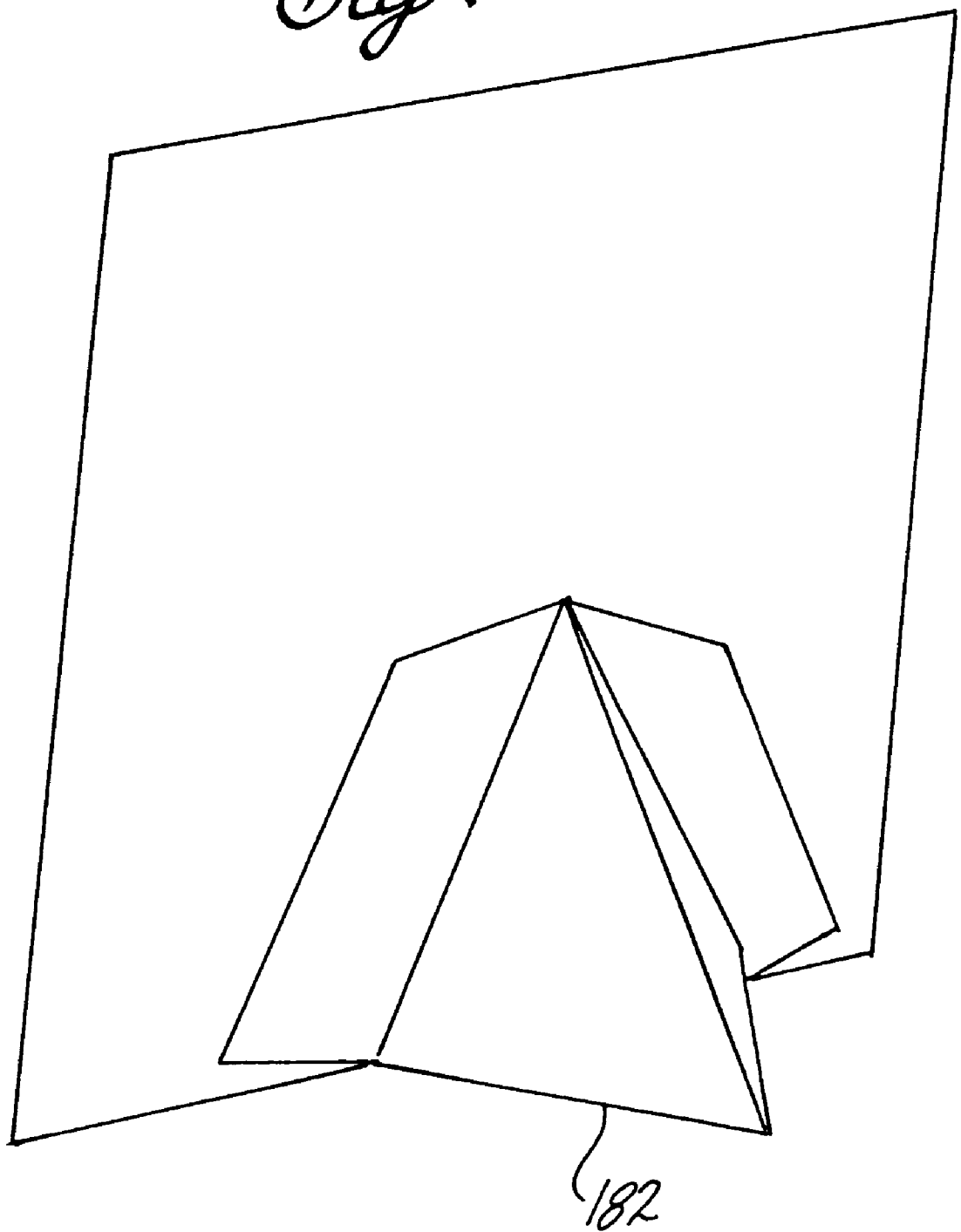

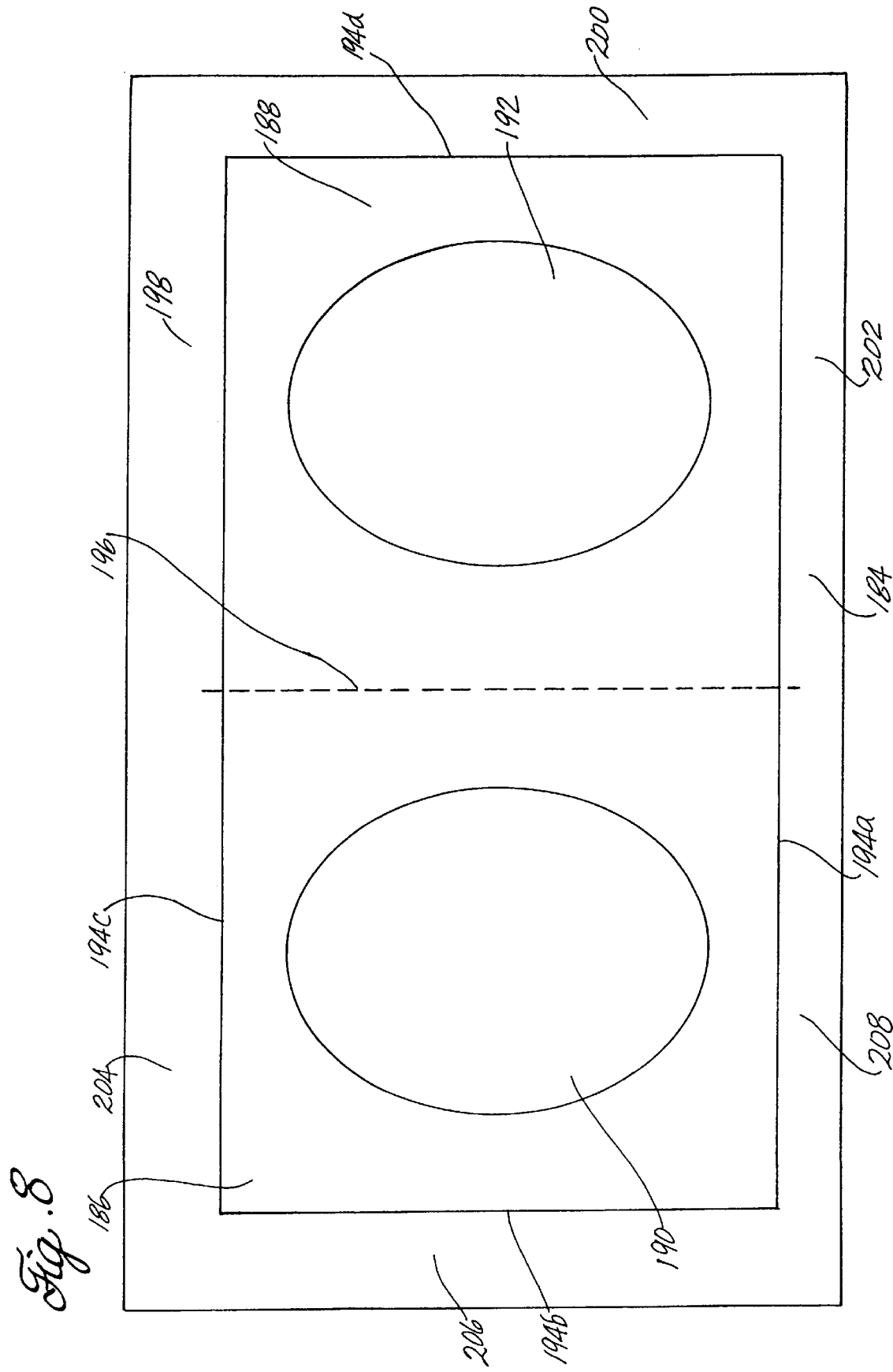

COMPUTER PROGRAM FOR GENERATING PICTURE FRAMES

FIELD OF THE INVENTION

This invention relates to a computer program for generating frames for pictures, photographs, and the like, and, in particular embodiments, a computer program that prints a frame pattern including a folding and cutting pattern on a substrate such that the substrate can be cut and folded according to the folding and cutting pattern to create a self-supporting picture frame.

BACKGROUND OF THE INVENTION

Traditionally, one method of creating picture frames made from paper is to manually draw designs on paper and then to cut and glue the paper to create a picture frame. An alternative method is to use a computer program for drawing applications such as Adobe Illustrator, Corel Draw, or Aldus Freehand to draw designs, print the designs, and then cut and glue the printed paper to create a picture frame. Such methods are time-consuming to use. Further, such methods require a separately made easel or stand to support the frame.

Therefore, it is a first object of the invention to provide an easy to use and quick method to generate picture frames. It is a second object to generate such frames that are self-supporting. It is a third object to permit the user to choose from a among a selection of types of frames and border patterns.

SUMMARY OF THE DISCLOSURE

According to an embodiment of the present invention, a computer program causes a computer to generate printer control information in response to user input on the computer. The printer control information causes a printer coupled to the computer to print a frame pattern having dimensions on a substrate such as paper. The frame pattern may include a folding and cutting pattern, such that after folding and cutting the printed substrate according to the folding and cutting pattern, a frame suitable for holding a picture is provided. The computer program according to an embodiment of the present invention includes an interface routine which prompts the user for input information to select at least one of the dimensions for the picture frame. The computer program according to an embodiment of the present invention also includes a frame pattern generating routine which responds to the interface routine and generates printer control information to cause the printer to print the frame pattern.

The folding and cutting pattern may include an easel-back pattern, such that after folding and cutting the printed substrate according to the folding and cutting pattern, an easel-back for enabling the upright display of the frame is formed. The frame pattern may include one or more design patterns.

According to another embodiment of the present invention, a computer system causes a computer to generate printer control information in response to user input on the computer. The printer control information causes a printer to print an user-selectable frame pattern having user-selectable dimensions on a substrate such as paper. The frame pattern includes a folding and cutting pattern, such that after folding and cutting the printed substrate according to the folding and cutting pattern a frame suitable for holding a picture is provided. The computer system comprises an interface means which prompts the user for input information to select at least one of the dimensions for the frame. The computer system also comprises a frame pattern generating means which responds to the interface means and generates printer control information to cause the printer to print the frame pattern.

The folding and cutting pattern may include an "easel-back" pattern, such that after folding and cutting the printed substrate according to the folding and cutting pattern, an easel-back for enabling the self-supporting upright display of the frame is formed. The frame pattern may include one or more design patterns.

According to another embodiment of the present invention, a method causes a computer to generate printer control information in response to user input on the computer. The printer control information causes a printer to print a frame pattern having dimensions on a substrate such as paper. The frame pattern includes a folding and cutting pattern, such that after folding and cutting the printed substrate according to the folding and cutting pattern a frame suitable for holding a picture formed. The method includes the step of prompting the user for input information to select at least one of the dimensions for the frame and the step of generating the printer control information to cause the printer to print the frame pattern.

The folding and cutting pattern may include an easel-back pattern, such that after folding and cutting the printed substrate according to the folding and cutting pattern, an easel-back for enabling the upright display of the frame is formed. The frame pattern may include one or more design patterns.

According to another embodiment of the present invention, a frame suitable for holding a picture is provided. The frame is made from a substrate, such as paper, which has printed on it a frame pattern that includes a folding and cutting pattern so that after folding and cutting the substrate according to the folding and cutting pattern, the frame suitable for holding a picture is provided. The frame pattern is printed by a printer controlled by printer control information which is generated by a computer program.

The folding and cutting pattern may include an easel-back pattern, such that after folding and cutting the printed substrate according to the folding and cutting pattern, an easel-back for enabling the upright display of the frame is formed. The frame pattern may include one or more design patterns.

According to yet another embodiment of the present invention, a computer program for causing a computer to generate printer control information in response to user input on the computer is provided. The printer control information causes a printer to print a frame pattern which has dimensions on a substrate, such as paper. The frame pattern includes a folding and cutting pattern, such that after folding and cutting the printed substrate according to the folding and cutting pattern a frame is provided suitable for holding a picture. The computer program is stored on a computer readable medium. The computer program includes an interface routine means which prompts the user for input information to select at least one of the dimensions for the frame and a frame pattern generating routine means which responds to the interface routine to generate printer control information to cause the printer to print the frame pattern.

The folding and cutting pattern may include an easel-back pattern, such that after folding and cutting the printed substrate according to the folding and cutting pattern, an easel-back for enabling the upright display of the frame is formed. The frame pattern may include one or more design patterns.

Other features and advantages of the invention will become apparent from the following detailed description, taken in conjunction with the accompanying drawings which illustrate, by way of example, various features of embodiments of the invention.

BRIEF DESCRIPTION OF THE DRAWINGS

A detailed description of embodiments of the invention will be made with reference to the accompanying drawings, wherein like numerals designate corresponding parts in the several figures.

FIGS. 2A, 2B, 2C and 2D show example of user-interfaces according to an embodiment of the present invention.

FIG. 3 shows an example of an user-interface according to an embodiment of the present invention which allows the user to preview design patterns.

FIGS. 5A, 5B, 5C, and 5D show an example of a folding and cutting pattern for pictures smaller than 5"×7" and the steps for assembling such a picture frame according to an embodiment of the present invention.

FIGS. 6A, 6B, 6C and 6D show an example of a folding and cutting pattern for square pictures and pictures that are 5"×7" or larger and the steps for assembling such a picture frame according to an embodiment of the present invention.

FIGS. 7A, 7B, 7C, 7D, 7E, 7F, and 7G show an example of a folding and cutting pattern for 8"×10" pictures and the steps for assembling such a picture frame according to an embodiment of the present invention.

FIG. 8 shows an example of a double-sided picture frame and the steps for assembling such a picture frame according to an embodiment of the present invention.

DETAILED DESCRIPTION OF THE PREFERRED EMBODIMENTS

Figure 1:
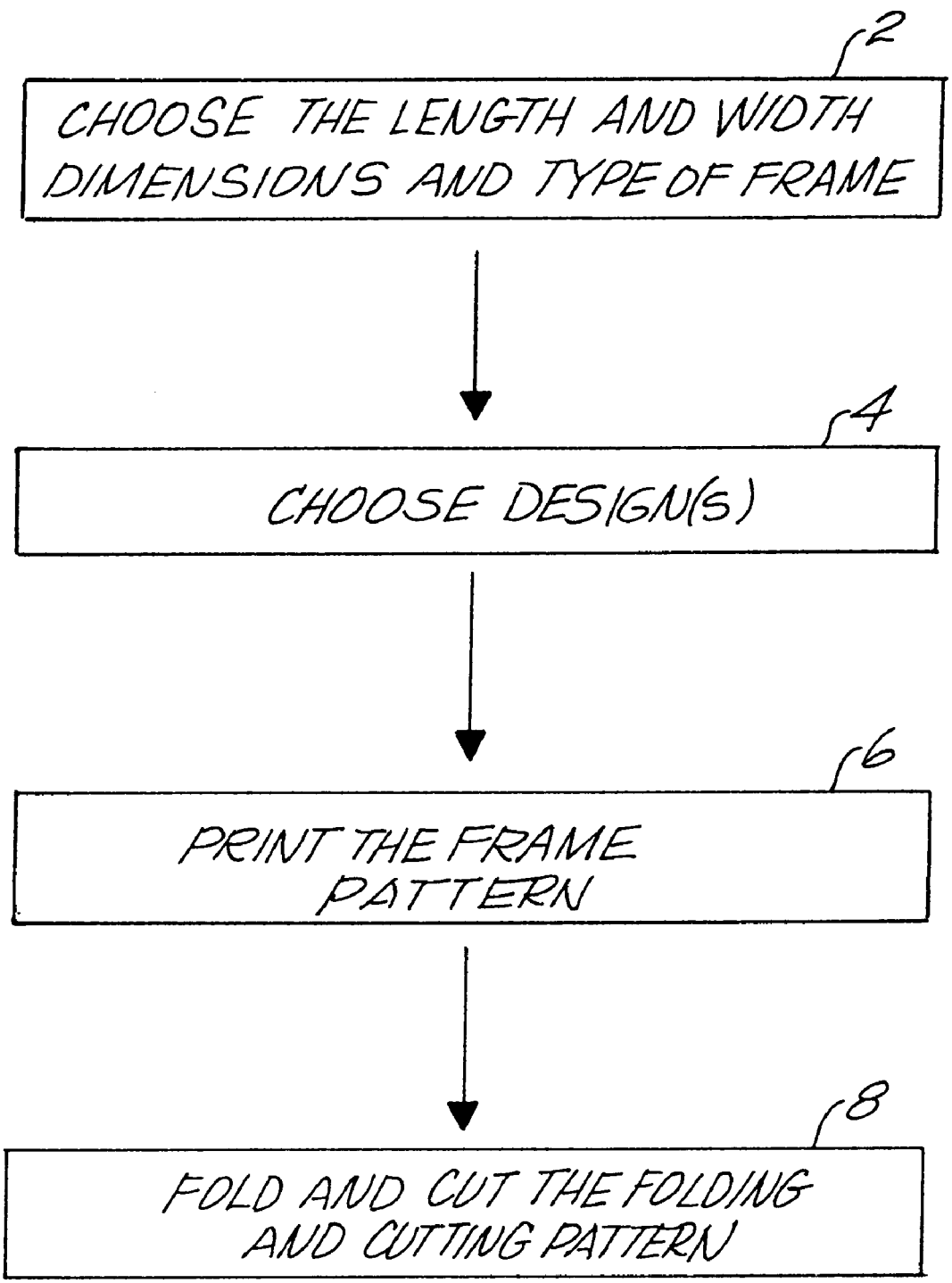
FIG. 1 is a flowchart illustrating the steps for making a picture frame according to embodiments of the present invention.

FIG. 1 is a flowchart illustrating the steps for making a picture frame using a computer program which is programed according to an embodiment of the present invention. This program may operate on a conventional personal computer using a Windows or Mac operating system and may use a conventional Windows user interface including pull-down menus, buttons, or graphical menus.

Figure 2A:
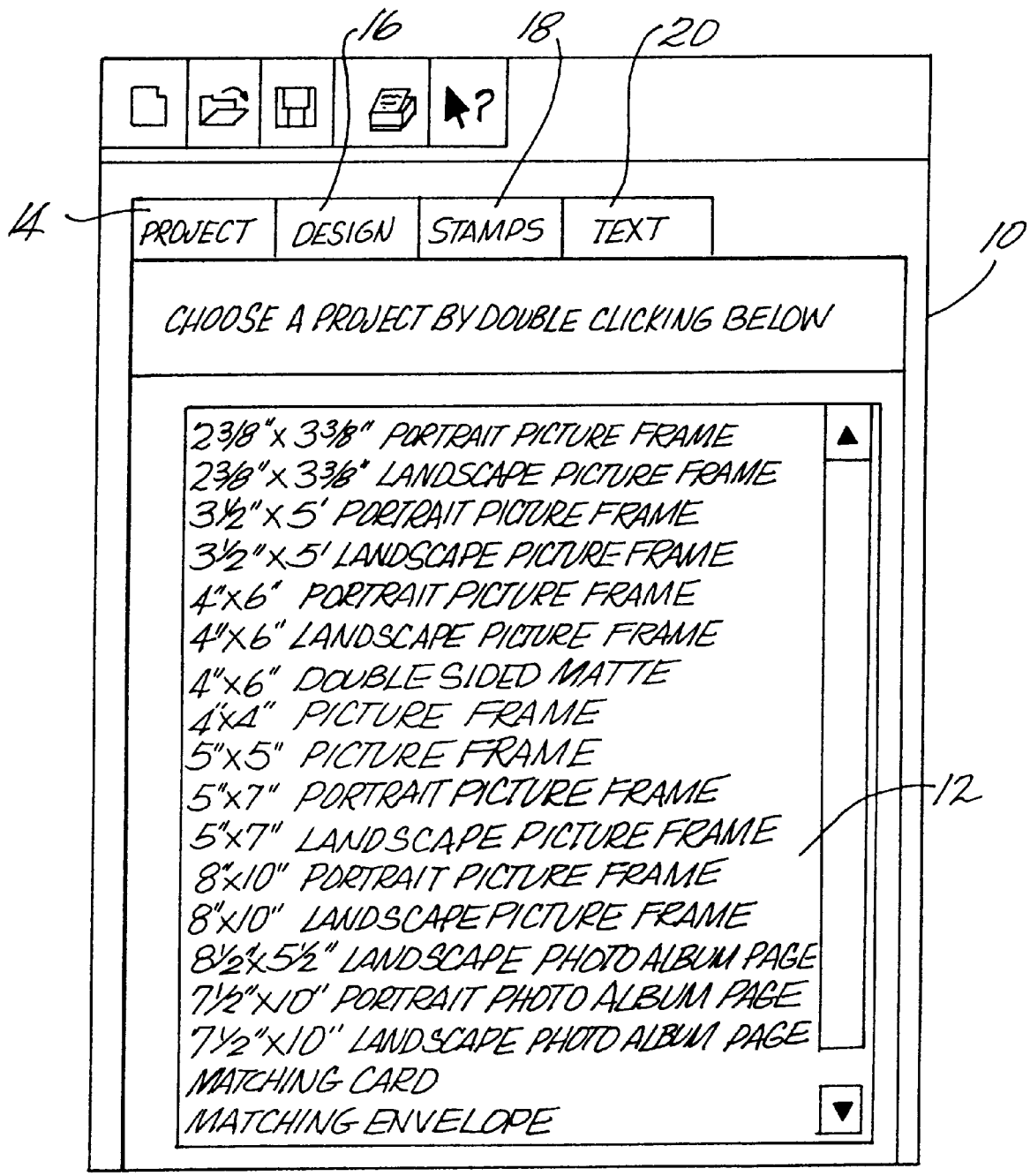

The computer program according to an embodiment of the present invention includes an interface routine which prompts the user to select dimensions for the picture frame and design patterns pre-stored in the computer program or imported by the user. FIG. 2A shows an example of a portion of an user-interface 10 according to an embodiment of the present invention. The first step 2 of the method according to an embodiment of the present invention is choosing the length and width dimensions for the desired finished picture frame, such as 4"×6", 5"×7", or 3"×5" and the type of frame, such as portrait, landscape, or double-matte. According to a preferred embodiment of the present invention, which is shown in FIG. 2A, a table 12 of dimensions and types of frames are available to the user after the user clicks on the "project" button 14 with a mouse or similar device. Other dimensions may also be used. According to an alternative embodiment, an user would input the length and width dimensions and the type of frame, and the computer program embodying the present invention would perform the necessary calculations such as by using interpolation and stored information for certain predetermined dimensions to generate the printer control information to print a folding and cutting pattern.

The second step 4 of the present invention is optional. If the user desires to have design patterns on the picture frame, then the user can import one or more design patterns or choose one or more design pattern from a plurality of patterns stored in the computer program which is programmed according to an embodiment of the present invention. The design pattern may include one or more of a border pattern, imported art, stamps, and texts.

Figure 2B:
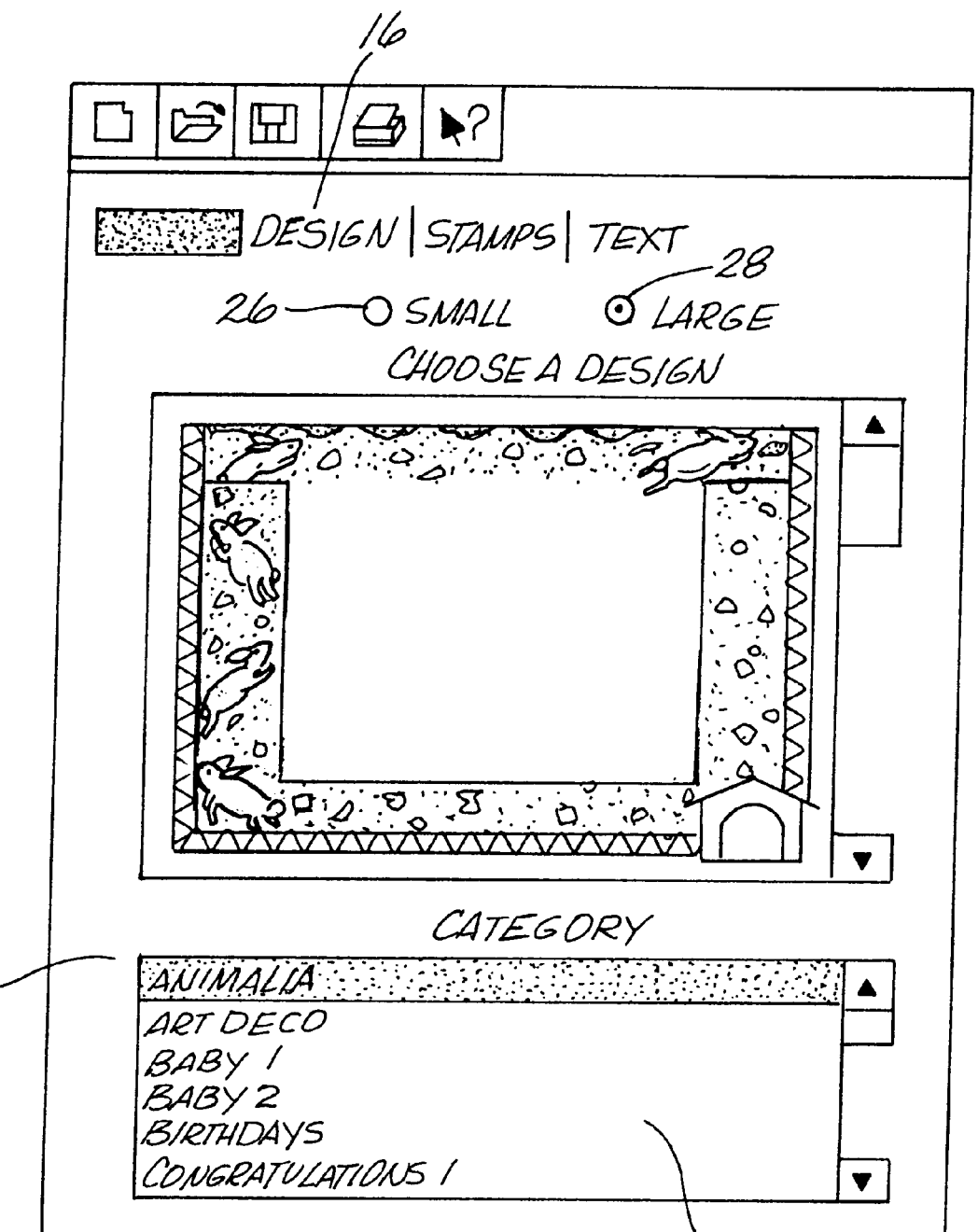

The design patterns may be selected from a menu, and a preview feature may be provided. According to the embodiment shown in FIG. 2A, an user would click on the "design" button 16 to choose a border pattern and preview the pattern. The display after an user clicks on the "design" button 16 is shown in FIG. 2B. The border patterns can embody themes such as birthday, Christmas, anniversary, etc. According to the embodiment shown in FIG. 2B, border patterns are organized in border categories 24 such as Animalia, Art Deco, Baby, . . . etc. Clicking on the category Animalia 22 allows the user to preview patterns embodying an "animal" theme. According to the embodiment shown in FIG. 2B, an user may click on the "small" button 26 to preview four border patterns, or click on the "large" button 28 to preview one border pattern, as shown in FIG. 2B.

Figure 2C:
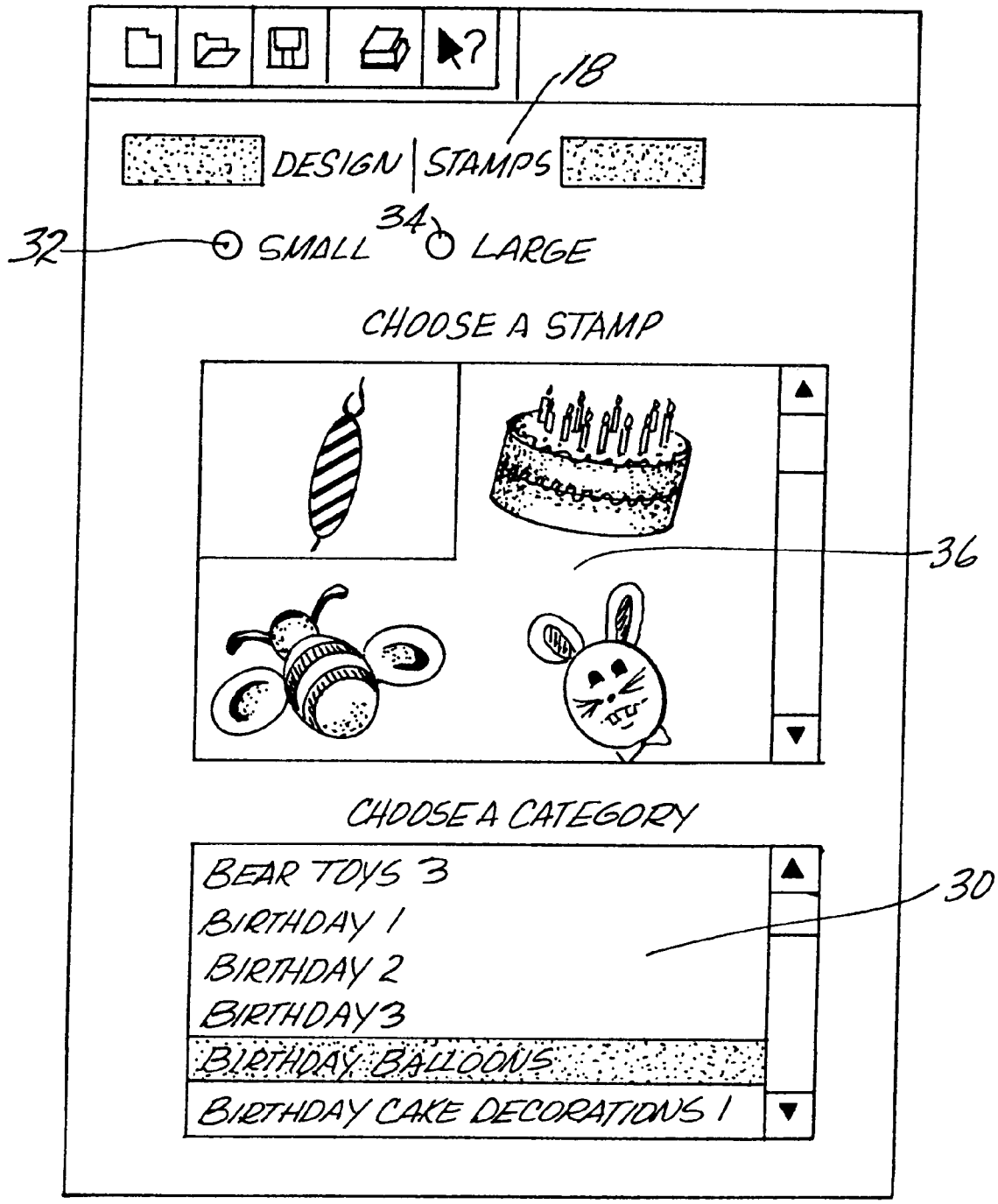
Figure 20:
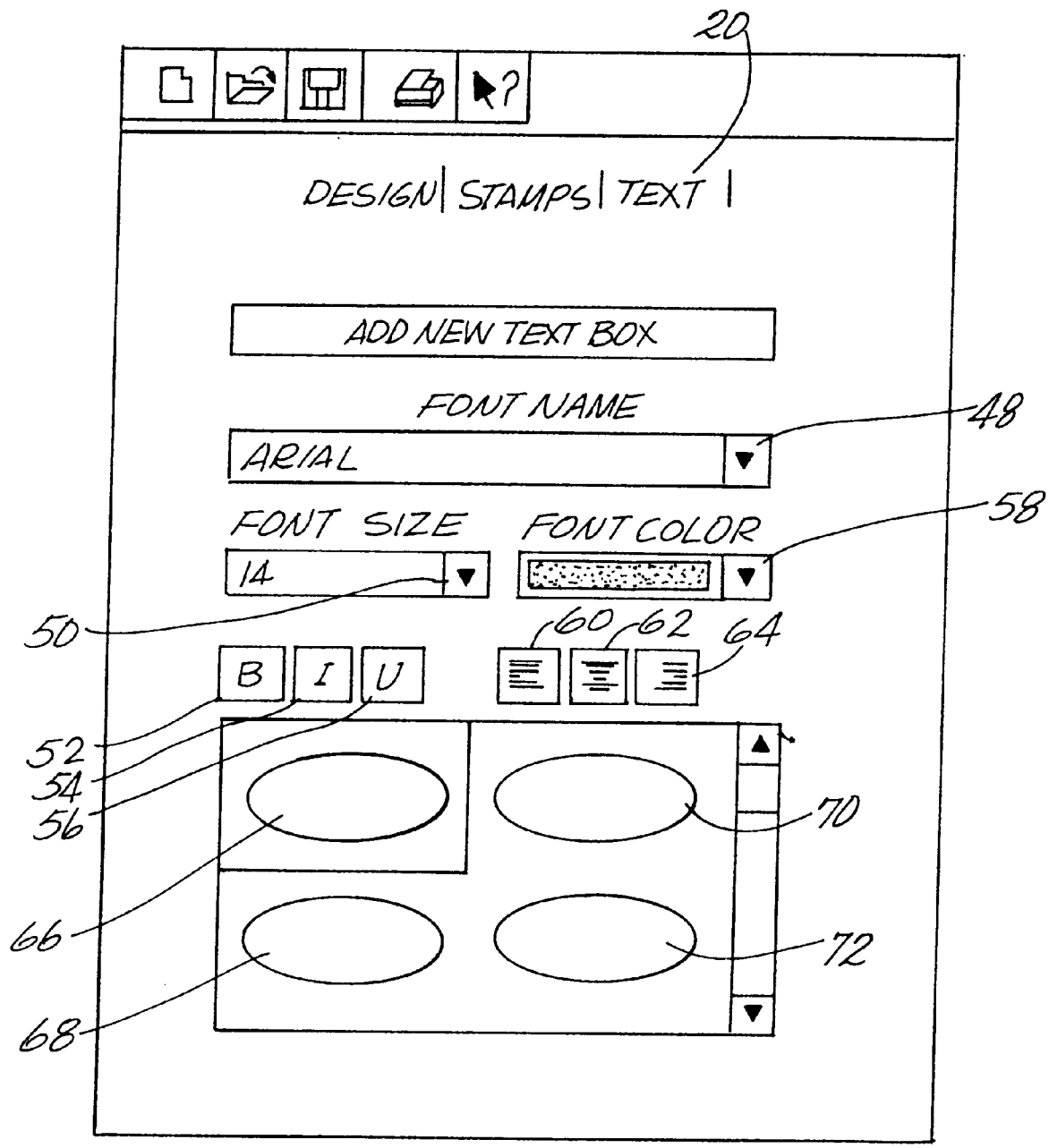

According to an embodiment of the present invention, an user can also select from a plurality of stamps stored in the computer program designed according to the present invention. According to the embodiment shown in FIG. 2A, an user would click on the "stamps" button 18 to select one or more stamps. The display after an user clicks on the "stamps" button 18 is shown in FIG. 2C. The stamps can also embody themes such as birthday, Christmas, anniversary, etc. to match the themes of the border patterns. According to the embodiment shown in FIG. 2C, stamps are organized in stamps categories 30 such as Bear Toys, Birthday, Birthday Balloons . . . etc. An user could also click on the "large" button 34 to preview one stamp or click on the "small" button 32 to preview four stamps, as shown in FIG. 2C, which shows examples of stamps 36, all of which depict a birthday theme.

According to an embodiment of the present invention, as shown in FIG. 3, an user could preview the final design pattern, which may incorporate border patterns, stamps, imported art, and texts. FIG. 3 shows a design pattern with a border pattern 38, a stamp 40, and texts 42, 44. According to an embodiment of the present invention, the stamps can be placed anywhere on the border pattern 38 or on the window area 46 inside of the border pattern, as shown in FIG. 3. Stamps can be of any size that is within the dimensional limitations of the chosen picture frame.

In addition to the prestored border patterns and stamps, the user may import patterns in formats such as .BMP, .WMF, .TIF, .PCD, .EPS, .JPG, .JIF, .TGA, .PCX, .WPG, and .PCT. The imported photograph or art can be a design or a scanned photograph stored in computer memory and accessible by the computer program embodying the present invention. The imported photograph or art can be placed on the border pattern area in lieu of the border pattern, as a stamp superposed on a border pattern, on part of the window area 46, or the ertire window area 46 so that insertion of a photograph during step four of the present invention is unnecessary According to an embodiment of the present invention, the user can also choose to place text on the design pattern. According to the embodiment shown in FIG. 2A, an user would choose to input text by clicking on the "text" button 20. FIG. 2D shows the display menu after an user clicks on the "text" button 20. According to such embodiment, an user can change font type by choosing a font type using the "font name" scrollbar 48, font size by choosing a size from the "font size" scrollbar 50. The user can also choose boldface, italics and underline by clicking on the "B", the "I", and the "U" buttons 52, 54, 56, respectively. The user may also choose font color by using the "font color" scrollbar 58. The user can choose to left align the text by clicking on the left align button 60, center the text by clicking on the center button 62, and right align the text by clicking on the right align button 64. An user can also add talk balloons by choosing one of the four talk balloons 66, 68, 70, and 72.

Figure 4:
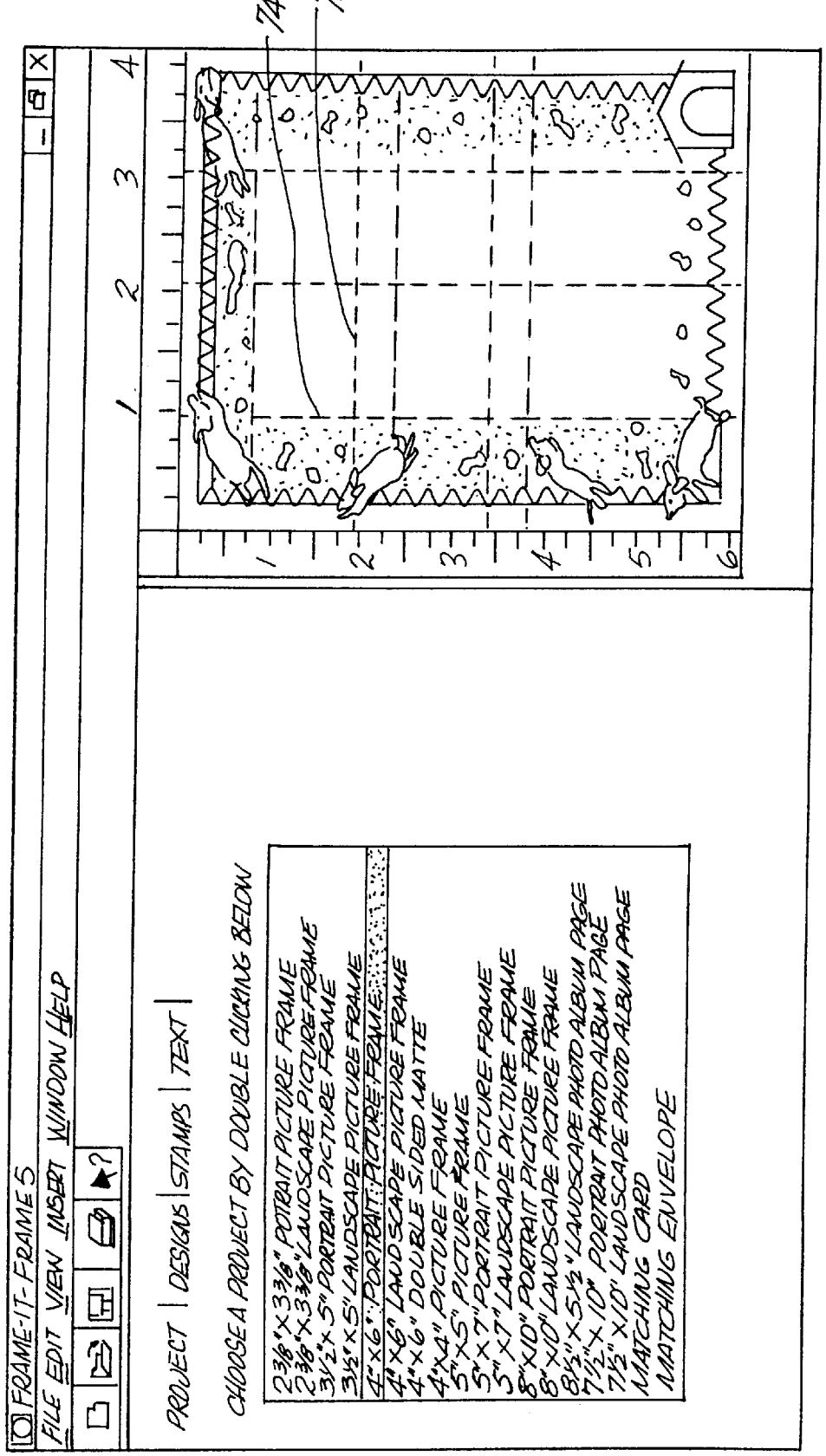
FIG. 4 shows an example of an user-interfacing according to an embodiment of the present invention using guidelines.

According to an embodiment of the present invention, the stamps, imported photographs or art, and texts can be repositioned, resized or cropped. Furthermore, as shown in FIG. 4, rulers 75 and guidelines 74, 76, which will not actually be printed may be shown as, for example, dotted horizontal and vertical lines that are used to assist in placing images and text blocks at precise positions. Vertical and horizontal guidelines 74, 76, respectively, can be set using a mouse to drag the guidelines to the desired place or by inputting the coordinates of the desired guidelines. According to yet another embodiment of the present invention, a snap distance function, which causes an image or text to "snap" to a guideline it is closest to or an intersection of guidelines, can also be utilized. Other features, such as spell checker, address book, mailing list can also be utilized in conjunction with this program. Matching cards and matching envelopes can also be created.

The third step 6 is the printing of the frame pattern on paper. A computer program which is programmed according to an embodiment of the present invention includes a frame pattern generating routine responsive to the interface routine which generates printer control information to cause the printer to print a frame pattern. The frame pattern includes the folding and cutting pattern and the optional design pattern, which includes one or more of a border pattern, imported art, stamps and texts.

The fourth step 8 is the folding and cutting of the paper according to the printed folding and cutting pattern and the inserting of picture(s). For pictures smaller than 5"×7", a folding and cutting pattern 78 according to an embodiment of the present invention generated on paper or another substrate is shown in FIG. 5A. The frame back 91 includes an easel-back folding and cutting pattern 93. If the user has chosen design patterns during step two, which include one or more of a border pattern, imported art, stamps, and texts, the design patterns would be printed on the frame border 80 and possibly the window 82. The picture frame is to be assembled by cutting away the area outside of the line segments 84a through 84m. The folding and cutting pattern is designed so that a picture may be secured in the window 82 that will be formed after folding and cutting. As discussed above, during step two, an user may have chosen to place art or imported picture in the window 82 in lieu of a separate photograph during step four. In this case, the window 82 should be left intact. During step two, an user may also have chosen to place design patterns on part of the window 82. In this case, the part of the window 82 with design patterns should also be left intact. On the other hand, if the user has not chosen to place design patterns on the window 82, then the window 82 is also cut away.

Figure 5B:
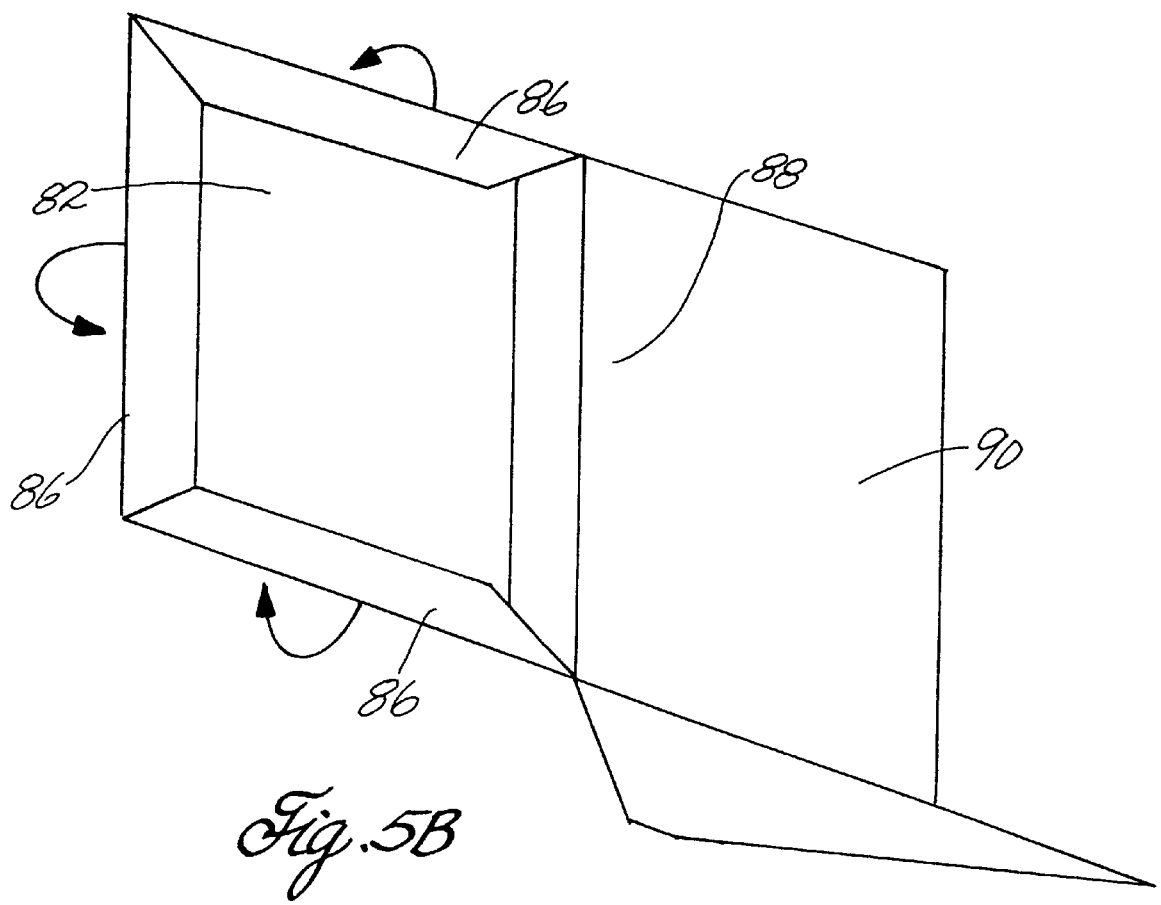

FIG. 5B is a rear view of the folding and cutting pattern 78 shown in FIG. 5A. A picture is to be placed so that the image is visible inside the window 82, and the flaps 86 folded to secure the picture as shown in FIG. 5B. Then, the folding and cutting pattern 78 is folded along line 88 towards the user. Finally, the flaps 86 are secured to the rear 90 of the frame back 91 of the picture frame.

Figure 5C:
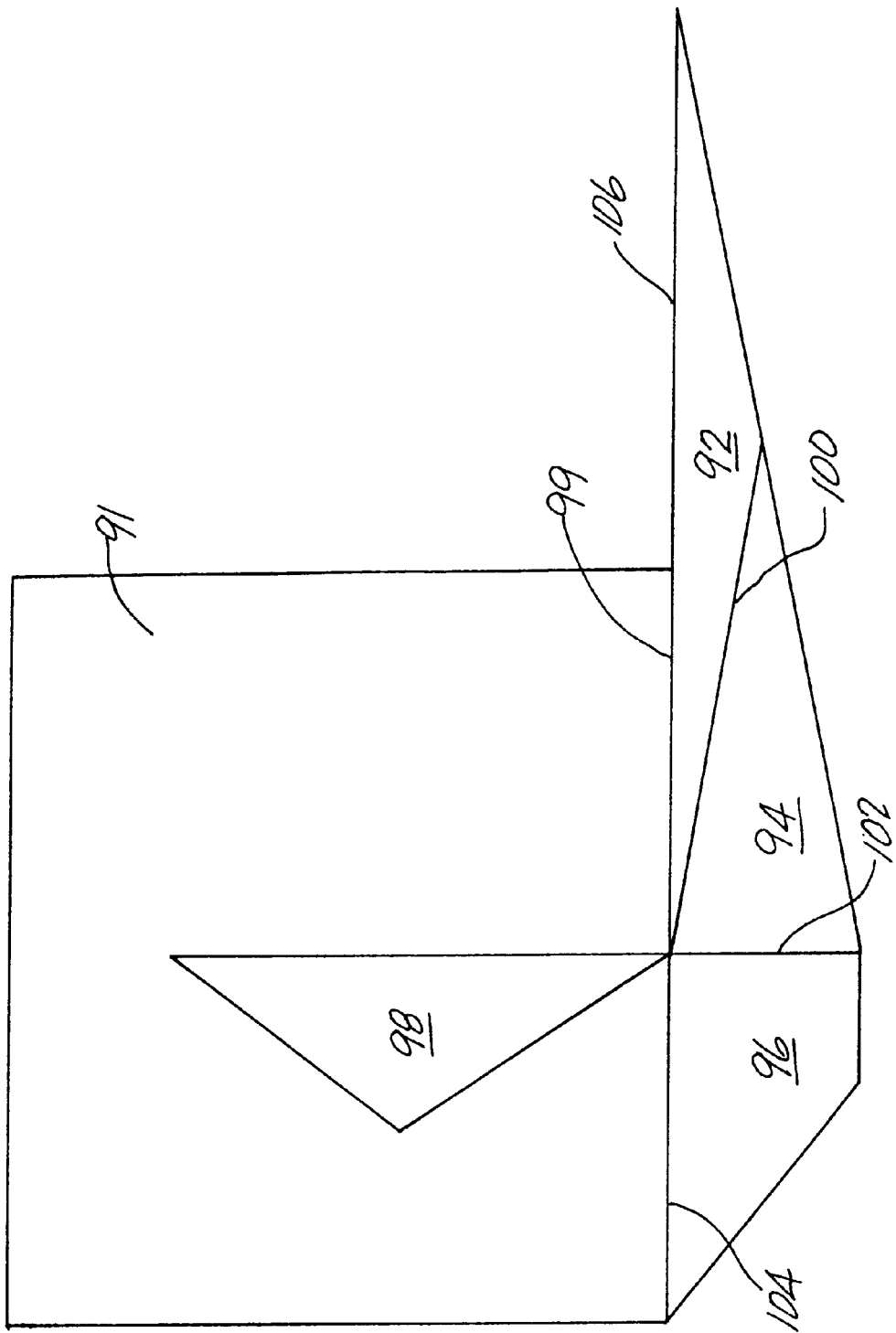

FIG. 5C shows the frame back 91 of the folding and cutting pattern 78 after folding, cutting and securing the picture. If an easel-back for the picture frame is not needed, then the triangles 92, 94, 96 should be cut away. If an easel-back for the picture frame is desired, then a cut is made along the line 99, ending at the tip of triangle 98. The triangle 92 created by the cutting described above is folded toward the triangle 94, along the line 100. The triangle 94 is folded toward the triangle 96, along the line 102. The triangle 96 is folded toward the triangle 98, along the line 104. The back 106 of the triangle 92 is secured to the triangle 98 by glue or tape or other adhesive as shown in FIG. 5D. The picture frame is now complete. The easel-back 108 can be laid flat by folding along the line 102.

Figure 6B:
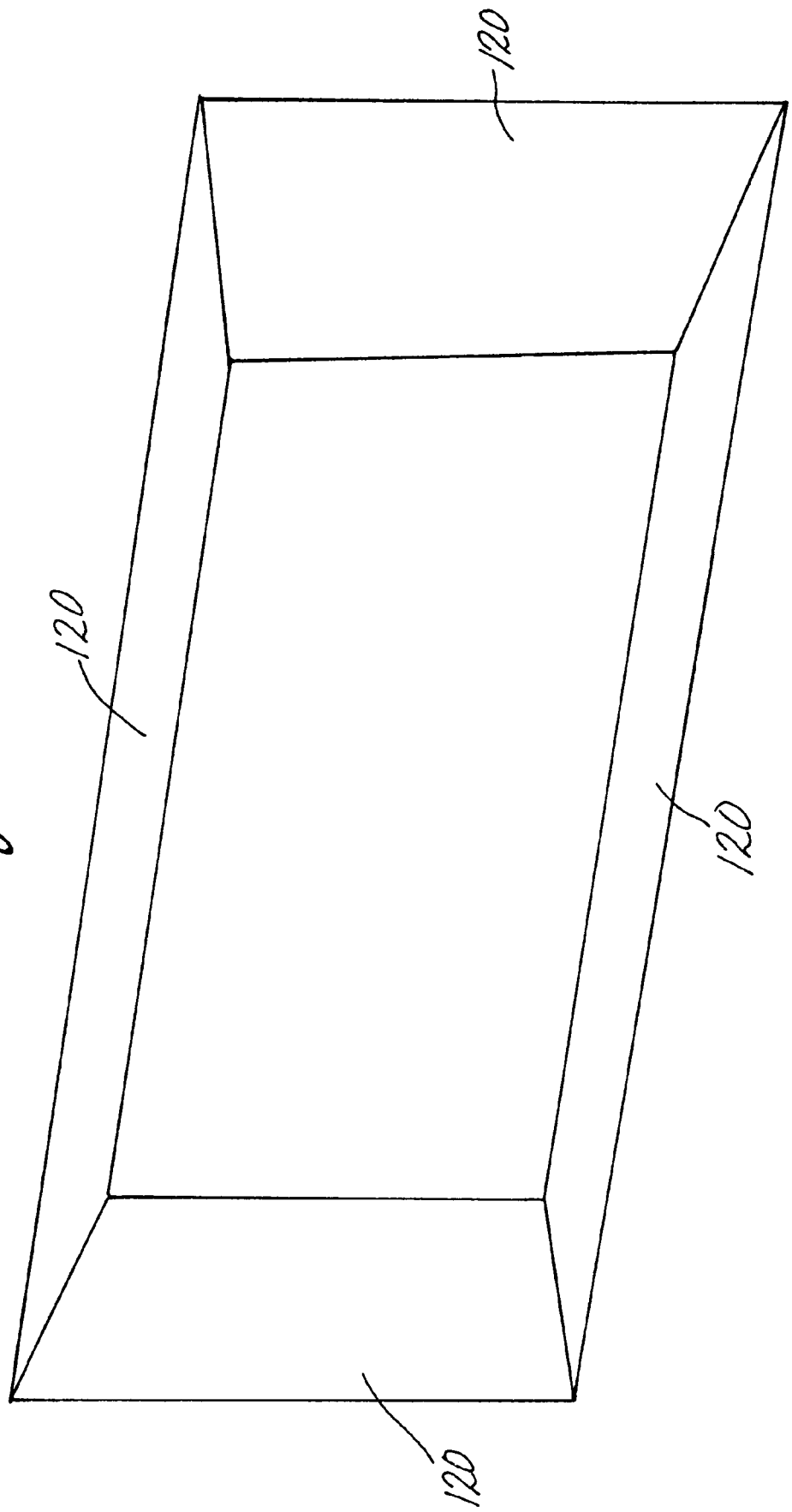

For pictures that are 5"×7" or larger or for square pictures, according to an embodiment of the present invention, two sheets are used if the printer is printing on A4 or 8½"×11" substrate. A folding and cutting pattern printed on two sheets 110, 112 according to an embodiment of the present invention is shown in FIGS. 6A and 6C. If the user had chosen design patterns, the design patterns would be printed on the frame border 114 and possibly the window 116. As shown in FIG. 6A, the picture frame is to be assembled by cutting away the window 116 and the area outside of the line segments 118a to 118h on the first sheet 110. As discussed above, the user may have chosen to place an imported picture inside the window 116 during step two in lieu of a separate photograph during step four. In this case, the window 116 should be left intact. Or, the user may have chosen to place design patterns on part of the window 116. In this case, that part of the window 116 should also be left intact. FIG. 6B is a rear view of the folding and cutting pattern 110. The picture is placed inside the window 116, and the flaps 120 secured to the picture, as shown in FIG. 6B.

Figure 6D:
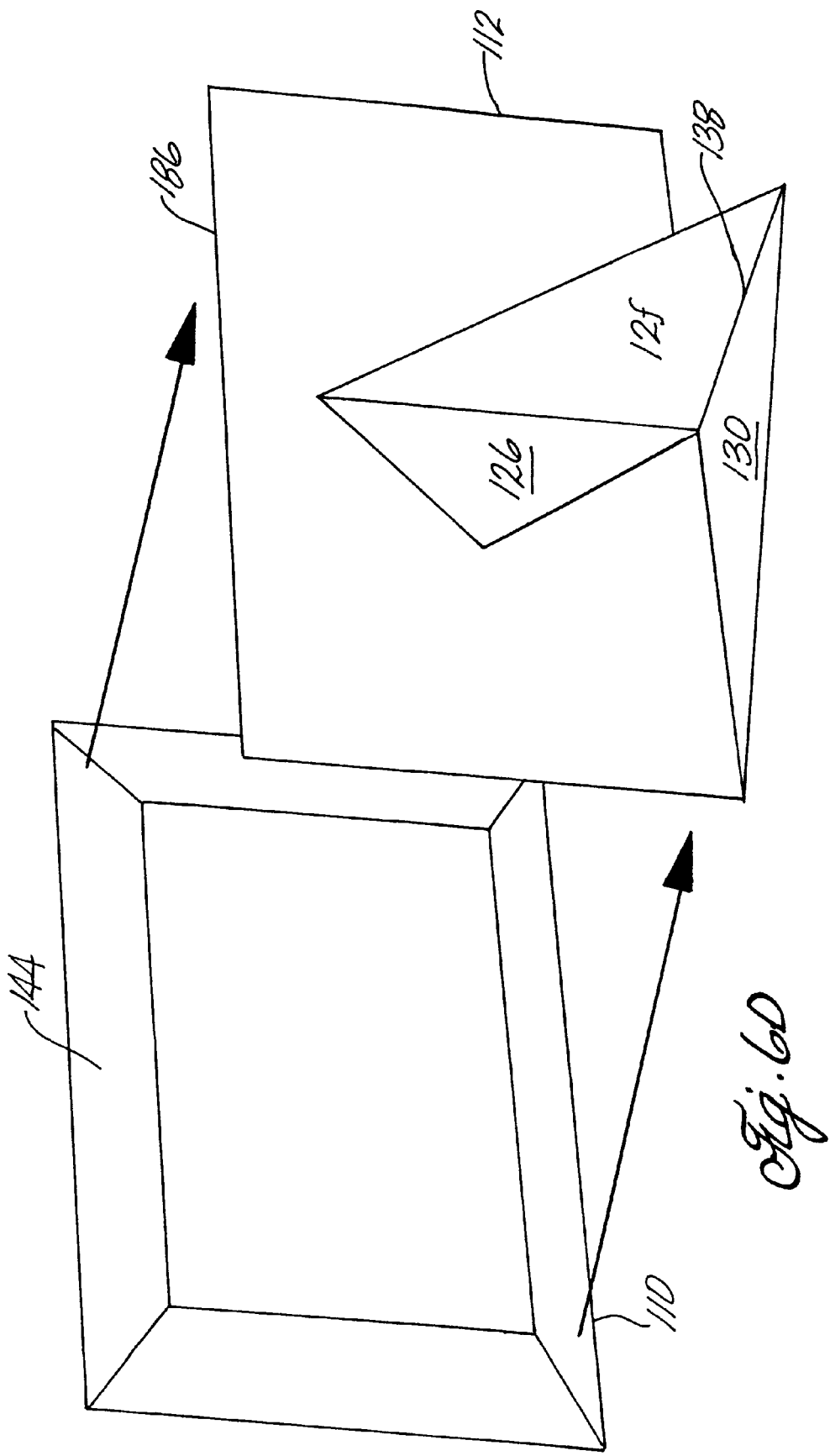

To complete the frame back, the area outside of the line segments 124a to 124f of the second sheet 112 shown in FIG. 6C should be cut away. If an easel-back stand is not necessary, then the bottom triangles 126, 128, 130 should be cutaway. If an easel-back stand is desired, then a cut is made along the line 134, ending at the tip of the triangle 132. The triangle 126 is folded along the line 136 toward the triangle 128. Then, the triangle 128 is folded toward the triangle 130, along the dashed line 138. Finally, the triangle 130 is folded toward the triangle 132, along the line 140. The back 142 of the triangle 126 is secured to the triangle 132 using glue, tape, or another adhesive as shown in FIGS. 6C and 6D. The back side 144 of the first sheet 110 is secured to the front side 146 of the second sheet 112 as shown in FIG. 6D. The picture frame can be laid flat by folding along the line 138.

Figure 7D:
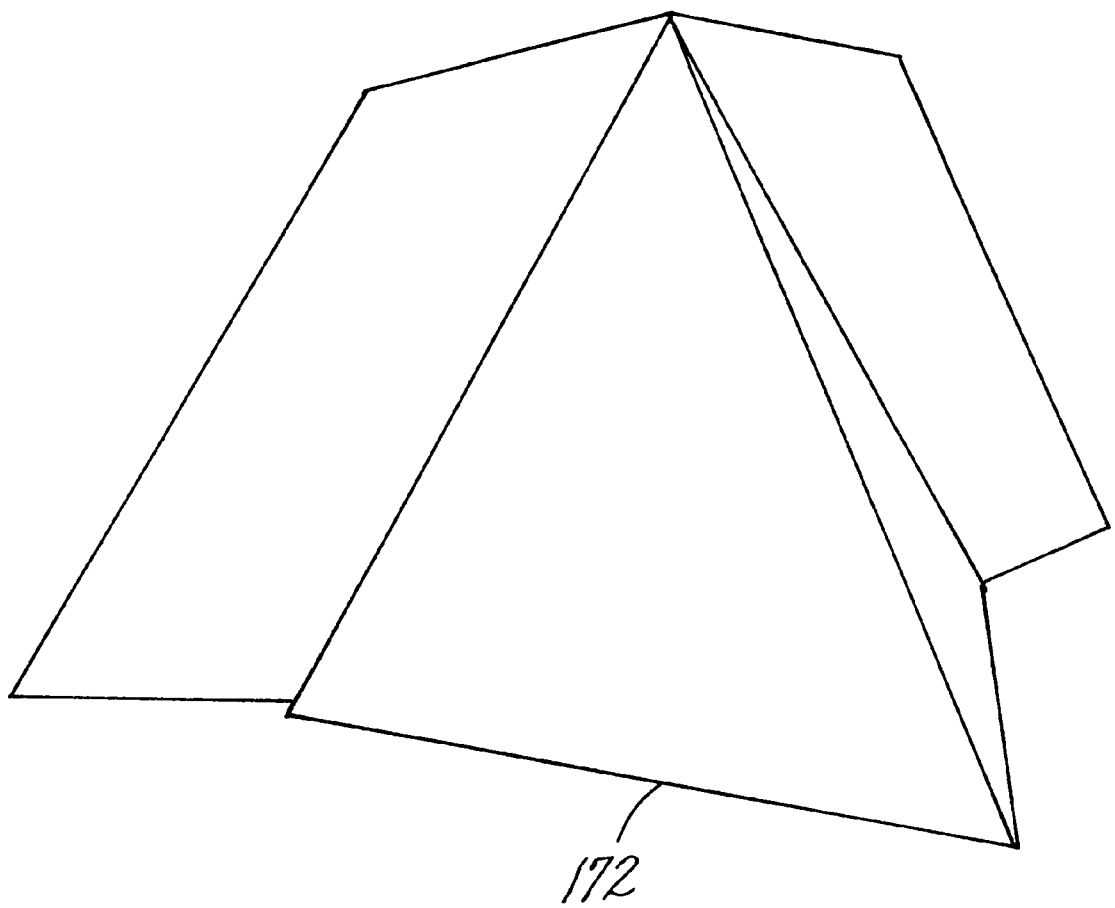
Figure 7E:
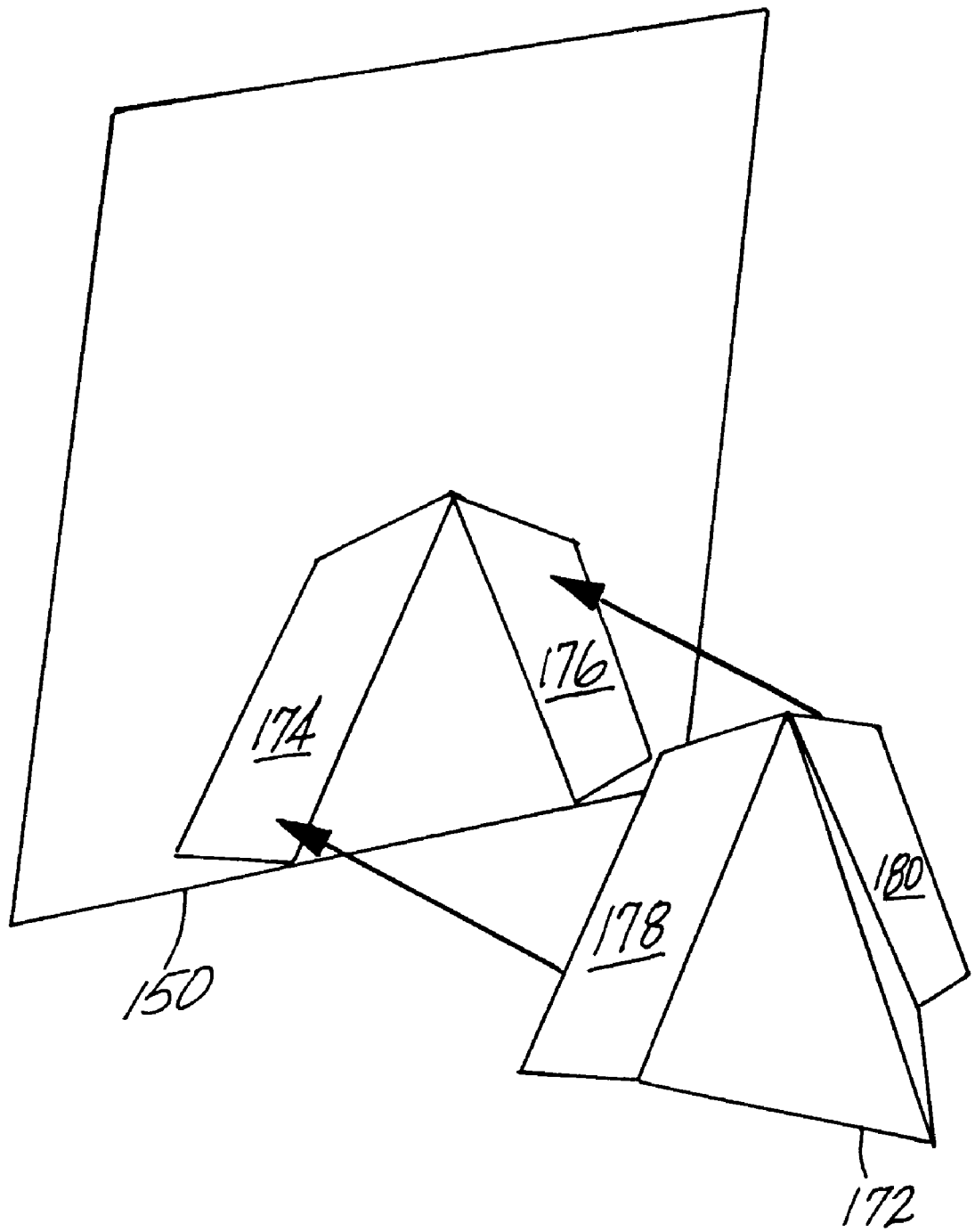
Figure 16:
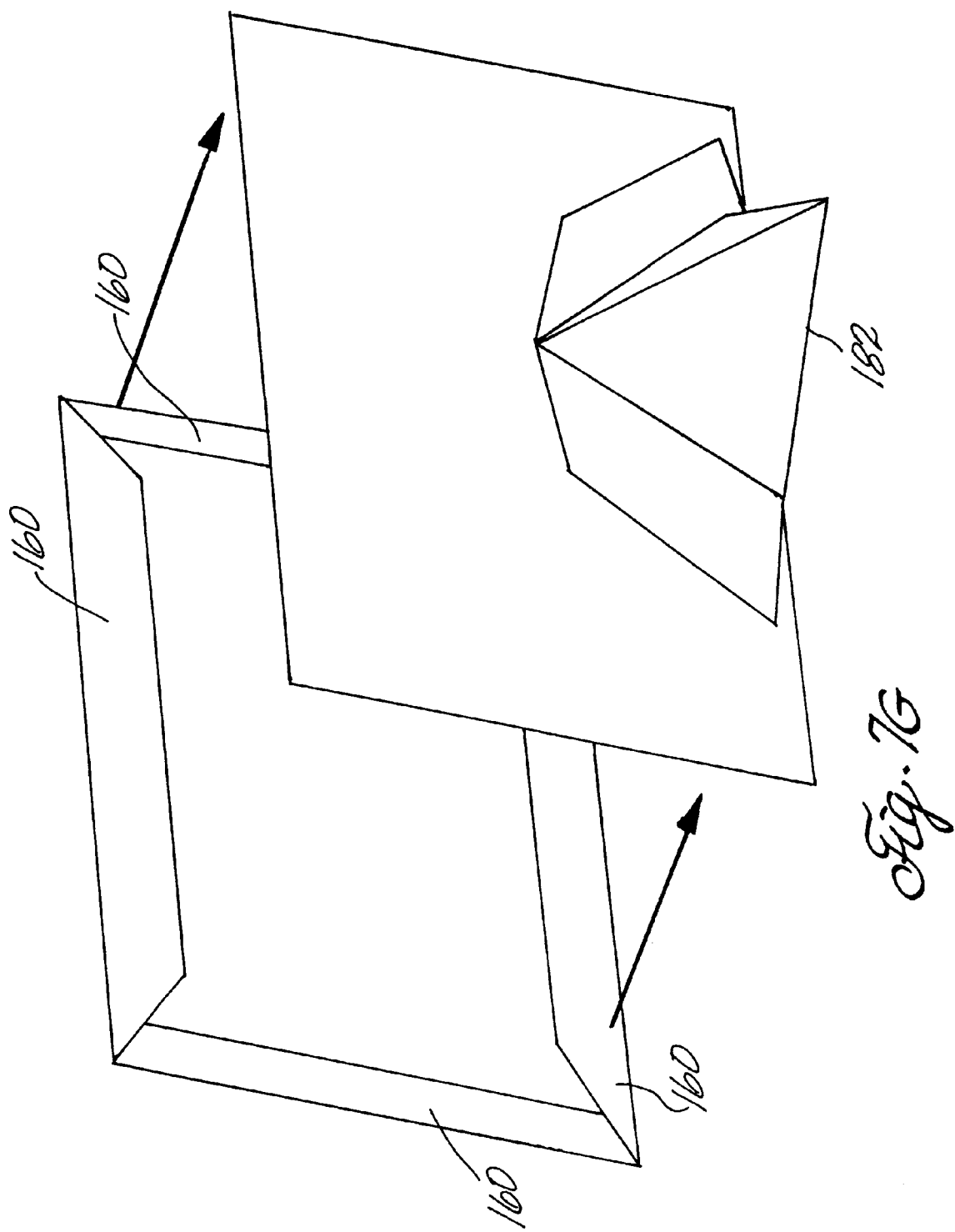

For 8"×10" photographs, a folding and cutting pattern according to an embodiment of the present invention is shown in FIGS. 7A–7C. Three sheets 148, 150, 152 are used, as shown in FIGS. 7A–7C, respectively. If the user has chosen design patterns, the design patterns would be printed on the frame border 158 and possibly the window 156. First, the area outside of the line segments 154a through 154h on the first sheet 148 are cut away. The area inside of the window 156 on the first sheet 148 are also cut away except for those portions with design patterns. The picture is placed inside the window 156, and the flaps 160 are folded over the picture as shown in FIG. 7G. Then, as shown in FIG. 7B, the area outside of the line segments 162a through 162d on the second sheet 150 is cut away. If an easel-back stand is desired, then, as shown in FIG. 7C, the area outside of the line segments 164a to 164g on the third sheet 152 is cut away. Folds are made on lines 166, 168, 170 to make the easel-back stand 172 shown in FIG. 7D. As shown in FIG. 7E, the areas 174, 176 are secured to the areas 178, 180 of the easel-back 172 to make the frame back 182 shown in FIG. 7F. Flaps 160 are attached to the frame back 182, as shown in FIG. 7G.

A folding and cutting pattern 184 for a double-sided matte picture frame is shown in FIG. 8. If the user has chosen design patterns, the design patterns would be printed on the frame borders 186, 188 and possibly the windows 190, 192. The picture frame is assembled by cutting away the area outside of the line segments 194a through 194d. The folding and cutting pattern is designed so that pictures are to be placed in the windows 190, 192. A, discussed above, during step two, the user may have chosen to place imported pictures on the windows 190, 192 in lieu of a separate photograph during step four. In this case, the windows 190, 192 should be left intact. Alternatively, the user may have chosen to put design patterns on a part of the windows 190, 192. In this case, the part of the windows 190, 192 with design patterns should also be left intact. On the other hand, if the user has not chosen to place design patterns on the windows 190, 192, then the windows 190, 192 are also cut away. Line 196 is folded, and pictures placed inside both windows 190, 192. The area 198, 200, 202 are then secured to the areas 204, 206, 208.

While the description above refers to particular embodiments of the present invention, it will be understood that many other types of folding and cutting patterns and user-interfaces may be used. Various other modifications may also be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A computer program stored on a machine readable medium for causing a computer to generate printer control information in response to user input on the computer, the printer control information causing a printer to print a frame pattern having dimensions on a substrate, the frame pattern comprising a folding and cutting pattern, such that after folding and cutting the printed substrate according to the folding and cutting pattern a frame is provided suitable for holding a picture, the computer program stored on one of a computer readable medium and comprising:

an interface routine prompting the user for input information to select at least one of the dimensions for the frame; and a frame pattern generating routine responsive to the interface routine for generating the printer control information to cause the printer to print the frame pattern.

2. A computer program according to claim 1 wherein the folding and cutting pattern comprises an easel-back pattern, such that after folding and cutting the printed substrate according to the folding and cutting pattern, an easel-back for enabling an upright display of the frame is formed.

3. A computer program according to claim 1 wherein the frame pattern further comprises at least one of a plurality of design patterns.

4. A computer system for causing a computer to generate printer control information in response to user input on the computer, the printer control information causing a printer to print a frame pattern having dimensions on a substrate, the frame pattern including a folding and cutting pattern, such that after folding and cutting the printed substrate according to the folding and cutting pattern a frame is provided suitable for holding a picture, the computer system comprising:

an interface means prompting the user for input information to select at least one of the dimensions for the frame; and a frame pattern generating means responsive to the interface means for generating the printer control information to cause the printer to print the frame pattern.

5. A computer system according to claim 4 wherein the folding and cutting pattern comprises an easel-back pattern, such that after folding and cutting the printed substrate according to the folding and cutting pattern, an easel-back for enabling an upright display of the frame is formed.

6. A computer system according to claim 4 wherein the frame pattern further comprises at least one of a plurality of design patterns.

7. A method of causing a computer to generate printer control information in response to user input on the computer, the printer control information causing a printer to print a frame pattern having dimensions on a substrate, the method comprising:

prompting the user for input information to select at least one of the dimensions for the frame; and generating the printer control information to cause the printer to print the frame pattern, including a folding and cutting pattern, such that after folding and cutting the printed substrate according to the folding and cutting pattern a frame is provided suitable for holding a picture.

8. A method according to claim 7 wherein the folding and cutting pattern comprises an easel-back pattern, such that after folding and cutting the printed substrate according to the folding and cutting pattern, an easel-back for enabling an upright display of the frame is formed.

9. A method according to claim 7 wherein the frame pattern further comprises at least one of a plurality of design patterns.

10. A frame suitable for holding a picture, wherein the frame is made from a substrate having a frame pattern, the frame pattern comprising a folding and cutting pattern wherein after folding and cutting the substrate according to the folding and cutting pattern, the frame suitable for holding a picture is provided, the frame pattern printed by a printer controlled by printer control information, the printer control information generated by a computer program.

11. A frame according to claim 10 wherein the folding and cutting pattern comprises an easel-back pattern, such that after folding and cutting the printed substrate according to the folding and cutting pattern, an easel-back for enabling an upright display of the frame is formed.

12. A frame according to claim 10 wherein the frame pattern further comprises at least one of a plurality of design patterns.

13. A computer program for causing a computer to generate printer control information in response to user input on the computer, the printer control information causing a printer to print a frame pattern having dimensions on a substrate, the computer program stored on one of a computer readable medium and comprising:

an interface means prompting the user for input information to select at least one of the dimensions for the frame; and a frame pattern generating means responsive to the interface means for generating the printer control information to cause the printer to print the frame pattern, the frame pattern comprising a folding and cutting pattern, such that after folding and cutting the printed substrate according to the folding and cutting pattern a frame is provided suitable for holding a picture.

14. A computer program according to claim 13 wherein the folding and cutting pattern comprises an easel-back pattern, such that after folding and cutting the printed substrate according to the folding and cutting pattern, an easel-back for enabling an upright display of the frame is formed.

15. A computer program according to claim 13 wherein the frame pattern further comprises at least one of a plurality of design patterns.

* * * * *